H. V. SMITH.
PLIERS.
APPLICATION FILED OCT. 4, 1916.
1,267,133.
Patented May 21, 1918.
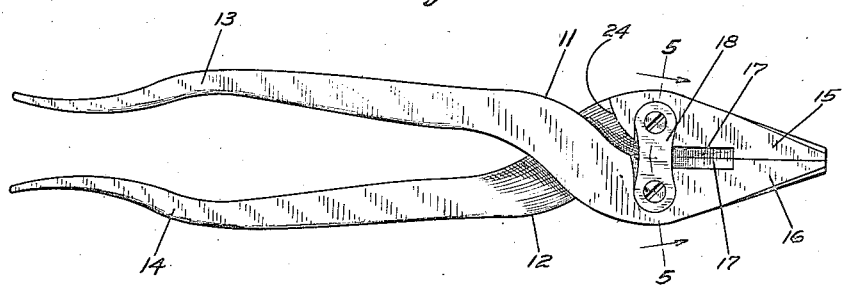
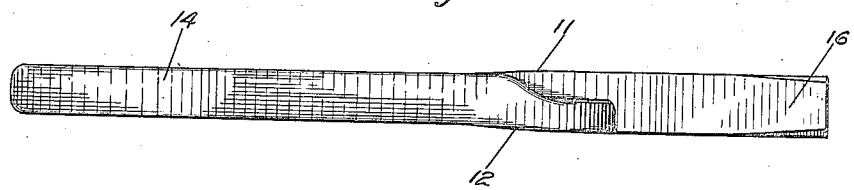
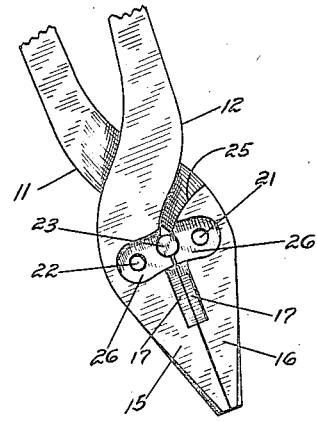
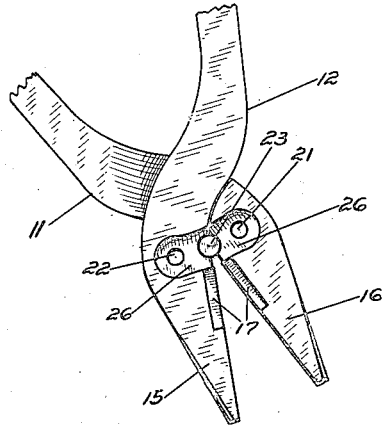
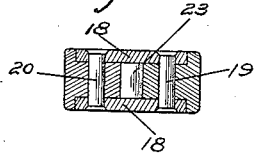
WITNESS
Chester F. Hayden.
INVENTOR
Henry V. Smith
BY
Wooster & Bowersock
ATTORNEYS

UNITED STATES PATENT OFFICE.

HENRY V. SMITH, OF BRIDGEPORT, CONNECTICUT, ASSIGNOR OF ONE-HALF TO EUGENE H. H. SMITH, OF BRIDGEPORT, CONNECTICUT.

PLIERS.

1,267,133.   Specification of Letters Patent.   Patented May 21, 1918.

Application filed October 4, 1916. Serial No. 123,757.

*To all whom it may concern:*

Be it known that I, HENRY V. SMITH, a citizen of the United States, residing at Bridgeport, county of Fairfield, State of Connecticut, have invented an Improvement in Pliers, of which the following is a specification.

This invention relates generally to pliers, and such auxiliary attachments or appurtenances as may under certain conditions be desired to or associated therewith or form a part thereof. The invention has more particular reference to the manner of pivotally connecting the two parts which coöperate to effect the desired results.

Heretofore, so far as I am aware it has been the more general practice to provide a single central pivot, which either acts individually or as a part of what may be termed a pivotal system. In the first case, it will be apparent that no different mechanical action is produced other than that of an ordinary pair of shears. In the second case, the so-called pivotal system is generally designed to insure movement of the gripping jaws in parallel at a sacrifice of both power and strength. Undoubtedly each form has its advantages, but both are subject to objections, because in securing these advantages sacrifices must be made in other directions, as suggested. I have found that through what may be termed a double or divided pivotal connection, I am enabled not only to enhance the applied forces in pliers of any given size, resulting from application of manual forces of the same degree, but also to provide a construction in which the mass of metal at the weak points of the device is not materially reduced for the purpose of providing bearings and bearing surfaces. The provision of a single pivotal point or fulcrum has undoubtedly been due, first, to an attempt to economize in cost of production, and, second, to a failure to recognize the necessity for a definite relationship between leverage and direction of movement.

The principal object of the present invention is to materially increase the power of pliers of a given size, and to secure at the same time—particularly when the device includes cutting or severing blades—what may be termed a shearing movement of the jaws, and to effect this increase in power and movement without reducing the mass of metal at the ordinarily weaker points of the levers and maintain a design which is conventional and therefore more readily marketable.

My invention will be better understood by reference to the accompanying drawings, forming a part of this specification in which—

Figure 1 is a side elevation of a pair of pliers embodying my invention;

Fig. 2 is a top plan or edge view thereof;

Fig. 3 is a fragmentary elevation of the side of the pliers opposite to that shown in Fig. 1, with the connecting link removed;

Fig. 4 is a view of the same with the jaws in an open condition, and

Fig. 5 is a section taken substantially on the line 5—5 of Fig. 1.

Referring now to the drawings in detail, I have shown my pliers as comprising the usual crossed members 11 and 12, the major portion of each thereof constituting an operating lever, 13 and 14, respectively, and the other ends, 15 and 16, providing the gripping jaws, and including such other instrumentalities as may be desired, such as the coöperating edged blades 17 17 for severing a strand of wire or the like.

Instead of being provided with a single centrally-located pivot, I provide each side of both of the members 11 and 12 with registering recesses or pockets 26 26 jointly adapted to receive and contain a link 18. The two opposite links 18 are connected at their ends by means of the pins or rivets 19 and 20 which pass through holes in the members 11 and 12, respectively, and thus form pivots about which these members may oscillate. Longitudinal movement of these members relative to each other, without interfering with pivotal movement thereof is minimized—and almost wholly prevented—by the interposition therebetween of what may be termed a roller 23, opposite faces of the jaws 15 and 16 being substantially circularly recessed to receive and contain this roller which is loosely held in place in said recesses by the links 18 18 (as shown in Fig. 5). Opening of the jaws 15 and 16 to an extent sufficient to permit of the dropping out of said roller is prevented by the shoulders 24 and 25 which provide stops which limit the extent to which said jaws may be separated.

Of course, the members 11 and 12 must have a certain movement about the pivots 21 and 22 relative to the links 18, and on this account I so dimension the recesses or pockets 26 in these members for the reception of the link ends as to provide sufficient play or clearance for this relative movement.

It will be apparent, first, as will appear from an inspection of Fig. 4, that if a single pivot were employed, or the two members have a common center of oscillation, this pivot or center must obviously be located at the intersection of the crossed members. By providing a separate pivot for each member, and relatively supporting and bracing the two pivots in a manner such as that described, the pivotal points—and therefore the lever fulcrums—may be located well forward of the mesne transverse plane of intersection, thereby effecting a relatively greater separation of the jaw-faces, when the jaws are open to the maximum extent, at the point of application of the greatest power; whereas, a single pivotal point obviously necessitates the interposition of portions of the crossed members between the pivot and the space between the open jaws, which carries the nearest point at which the wire or other article can be inserted between the jaws a substantial distance forward of the fulcrum, thus sacrificing power under the well-known principles of the lever. In the device of my invention, the wire to be cut, or the article to be gripped, may under ordinary conditions be so far inserted between the jaws as to approximate the common plane of the fulcrums.

Furthermore, each of these members rotates about its pivot as a center. Therefore, the point on the face of each jaw at which the article to be cut or gripped is located, has relative movement in the arc of a circle the radius of which is the distance from the center of the pivot to said point. This enables me to avail myself, in addition to ordinary leverage, of the relatively great power of the toggle. Theoretically, of course, these circles should be tangential, but in practice, of course, it is necessary to make them intersect. Obviously, the closer the body to be operated upon is brought to what may be termed the dead center—that is to say, to the common plane of the pivotal centers—the greater the power, and it will be apparent that in the device of my invention a wire or other body of a size such as that in connection with which a device of this character is normally designed to be used, may be inserted between the open jaws and located for operation at a point which approximates the plane of the pivot centers, thereby enabling me to apply power which may almost be said to be limited only by the inherent strength of the device of the whole.

I might also call attention to the fact that the two coöperating members of my device are identical—and therefore interchangeable—thus effecting a material saving in cost of manufacture over constructions which necessitate separate processes of production.

Having thus described a practical and convenient embodiment of my invention, I claim as new and desire to secure by Letters Patent:

1. A device of the character described comprising two crossed members provided with jaw portions and handle portions, each jaw portion having recesses in its sides registering with corresponding recesses in the other jaw, links extending transversely of the jaw portions and filling the recesses, pivot pins connecting the ends of the links with the respective members, and means loosely retained in position between the crossed members, by the links, for preventing substantial relative longitudinal movement of the crossed members.

2. A device of the character described comprising two crossed members provided with jaw portions and handle portions, links extending transversely of the jaw portions, pivot pins connecting the ends of the links with the respective jaw portions, and a roller loosely retained in position between the crossed members by the links, said jaw members having curved recesses to receive said roller, whereby substantially relative longitudinal movement of the crossed members is prevented.

In testimony whereof I affix my signature.

HENRY V. SMITH.